(12) United States Patent
Johnsen et al.

(10) Patent No.: US 12,270,260 B2
(45) Date of Patent: Apr. 8, 2025

(54) RISER CLAMP

(71) Applicant: MHWIRTH AS, Kristiansand S (NO)

(72) Inventors: John Magne Johnsen, Stabekk (NO); Patrick Nilsson, Glava (SE)

(73) Assignee: MHWIRTH AS, Kristiansand S (NO)

( * ) Notice: Subject to any disclaimer, the term of this patent is extended or adjusted under 35 U.S.C. 154(b) by 0 days.

(21) Appl. No.: 18/283,212

(22) PCT Filed: Mar. 22, 2022

(86) PCT No.: PCT/NO2022/050071
§ 371 (c)(1),
(2) Date: Sep. 21, 2023

(87) PCT Pub. No.: WO2022/203516
PCT Pub. Date: Sep. 29, 2022

(65) Prior Publication Data
US 2024/0167344 A1    May 23, 2024

(30) Foreign Application Priority Data
Mar. 23, 2021 (NO) .................................. 20210372

(51) Int. Cl.
| | |
|---|---|
| *E21B 17/10* | (2006.01) |
| *E21B 17/01* | (2006.01) |
| *E21B 17/02* | (2006.01) |
| *F16L 3/227* | (2006.01) |

(52) U.S. Cl.
CPC .......... *E21B 17/1035* (2013.01); *E21B 17/01* (2013.01); *E21B 17/026* (2013.01); *F16L 3/227* (2013.01)

(58) Field of Classification Search
CPC .... E21B 17/1035; E21B 17/01; E21B 17/026; F16L 3/08; F16L 3/227; F16L 3/10
See application file for complete search history.

(56) References Cited

U.S. PATENT DOCUMENTS

| | | | |
|---|---|---|---|
| 5,711,639 A * | 1/1998 | Tessier .................... | F16L 33/04 |
| | | | 24/483 |
| 8,540,029 B2 | 9/2013 | McMiles | |
| 8,783,630 B2 | 7/2014 | Gronlund et al. | |
| 9,512,941 B2 * | 12/2016 | Rodrigue .................. | F16L 3/13 |
| 2004/0062612 A1 | 4/2004 | van Belkom et al. | |

(Continued)

FOREIGN PATENT DOCUMENTS

| | | |
|---|---|---|
| CN | 207229029 U | 4/2018 |
| NO | 332565 B1 | 10/2012 |

(Continued)

*Primary Examiner* — Daniel P Stephenson
(74) *Attorney, Agent, or Firm* — Norman B. Thot

(57) ABSTRACT

A riser clamp for supporting fluid pipes in parallel with and spaced from an external surface of a tubular riser. The riser clamp includes at least one body portion which is arrangeable to form a clamp body which is substantially circular or partially circular, and a pipe saddle part. The clamp body encircles a clamp axis. The at least one body portion has an external surface which faces radially outwards and an internal surface which faces radially inwards. The pipe saddle part is provided to be separate and substantially planar, and is arranged to extend radially outwardly from the clamp body.

16 Claims, 13 Drawing Sheets

(56) References Cited

U.S. PATENT DOCUMENTS

| | | | |
|---|---|---|---|
| 2009/0050330 A1* | 2/2009 | Papon | E21B 17/1035 |
| | | | 166/367 |
| 2011/0042095 A1* | 2/2011 | Sessions | E21B 17/105 |
| | | | 166/360 |
| 2011/0316274 A1 | 12/2011 | Grønlund et al. | |
| 2016/0237758 A1 | 8/2016 | Whitefield et al. | |
| 2024/0167344 A1* | 5/2024 | Johnsen | F16L 3/227 |

FOREIGN PATENT DOCUMENTS

| | | | |
|---|---|---|---|
| WO | WO-0169117 A1 * | 9/2001 | E21B 17/1035 |
| WO | WO-0240821 A1 * | 5/2002 | E21B 17/01 |
| WO | WO 2010/107322 A1 | 9/2010 | |

* cited by examiner

RISER CLAMP

CROSS REFERENCE TO PRIOR APPLICATIONS

This application is a U.S. National Phase application under 35 U.S.C. § 371 of International Application No. PCT/NO2022/050071, filed on Mar. 22, 2022 and which claims benefit to Norwegian Patent Application No. 20210372, filed on Mar. 23, 2021. The International Application was published in English on Sep. 29, 2022 as WO 2022/203516 A1 under PCT Article 21(2).

FIELD

The present invention relates to a riser clamp which is configured to clamp around a riser and to carry a plurality of fluid pipes spaced from and parallel to the riser.

BACKGROUND

Risers are used to provide for communication between a subsea wellhead and a surface vessel, and are typically associated with a plurality of auxiliary fluid flow lines which provide alternative conduits for fluid flow between the surface and the wellhead. These auxiliary lines could, for example, provide the "choke and kill lines" which can be used to shut down the well in an emergency situation or to control the pressure in the well, respectively.

The riser and associated auxiliary lines can be many tens of meters long, and therefore merely supporting the auxiliary lines at their lowermost and uppermost ends can be insufficient to prevent the auxiliary lines from buckling during use, in particular when fluid in the auxiliary lines is pressurized. As such, it is known to provide the riser with a plurality of riser clamps which are each mounted on the riser and which are also coupled to the auxiliary lines. An important purpose of these clamps is to constrain movement of the auxiliary lines radially relative to the riser (i.e., perpendicular to the longitudinal axis of the riser), and thus to prevent the auxiliary lines from buckling. As the lines are subjected to drag forces from currents and waves, support from clamps is moreover required to limit the bending stresses resulting from these drag forces and to prevent the onset of vortex induced vibrations (VIV) that may cause fatigue. Since the auxiliary lines are relatively slender, the auxiliary lines would also move excessively during riser handling without the support from the clamps.

An example of such a riser clamp is described in WO2010/107322 and includes a pair of generally semi-circular clamp parts which are made from a fiber-reinforced composite material. These clamps parts are clamped around the riser using tensioning bands so that the two clamp parts together encircle the riser. Fiber-reinforced composite pipe saddles for supporting the auxiliary lines are integrally formed with the semi-circular clamp parts, and the auxiliary lines are fastened to the pipe saddles by clamps which are pivotally connected to each pipe saddle.

SUMMARY

An aspect of the present invention is to provide an improved configuration of riser clamp.

In an embodiment, the present invention provides riser clamp for supporting fluid pipes in parallel with and spaced from an external surface of a tubular riser. The riser clamp includes at least one body portion which is arrangeable to form a clamp body which is substantially circular or partially circular, and a pipe saddle part. The clamp body is configured to encircle a clamp axis. The at least one body portion comprises an external surface which faces radially outwards and an internal surface which faces radially inwards. The pipe saddle part is provided to be separate and substantially planar, and is arranged to extend radially outwardly from the clamp body.

BRIEF DESCRIPTION OF THE DRAWINGS

The present invention is described in greater detail below on the basis of embodiments and of the drawings in which.

DETAILED DESCRIPTION

Figure 1:
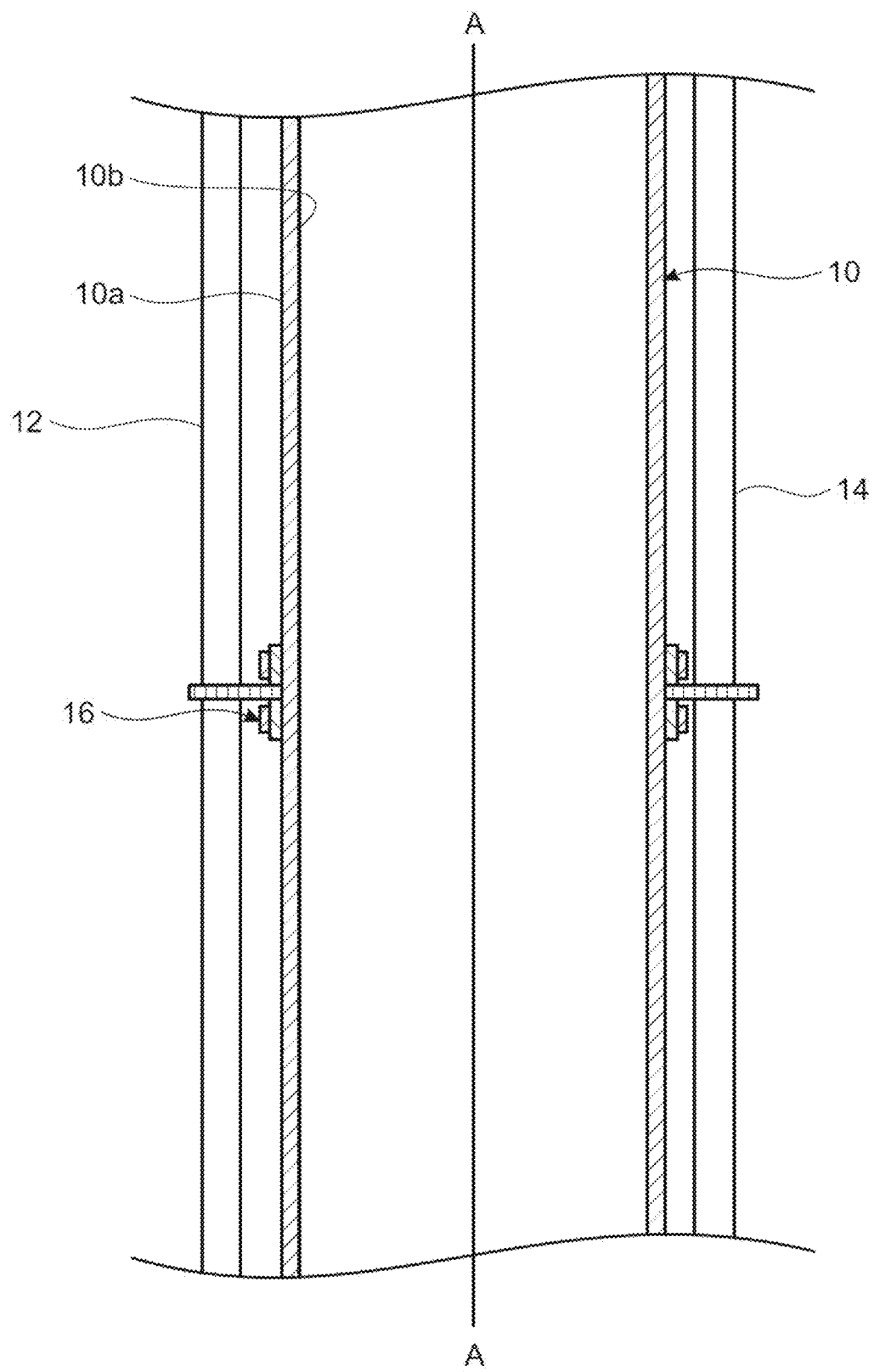
FIG. 1 illustrates a longitudinal cross-section through a riser section with auxiliary pipes secured thereto by riser clamps according to the present invention.

A first aspect of the present invention provides a riser clamp for supporting fluid pipes in parallel with and spaced from an external surface of a tubular riser, the riser clamp comprising at least one body portion which forms a generally circular or part circular body which encircles a clamp axis, the or each body portion having a radially outward facing external surface and a radially inward facing internal surface, the clamp further comprising a separate generally planar pipe saddle part which extends radially outwardly from the clamp body.

The or each body portion and pipe saddle part are advantageously made from a fiber reinforced composite.

The pipe saddle part advantageously extends generally perpendicular to the clamp axis.

the clamp advantageously comprises a plurality of body portions which can be arranged together to form a generally circular or part-circular clamp body which encircles the clamp axis.

One or more of the body portions is advantageously provided with a slot in which, to assemble the riser clamp, a proximal end of the pipe saddle part is placed.

The or each slot extends inwardly from the external surface of the body portion so that, when placed in the slot, the pipe saddle part extends radially outwardly from the external surface of the body part. The or each slot may extend through the entire thickness of the body portion from the external surface to the internal surface.

The slot advantageously has a longitudinal axis which extends generally perpendicular to the clamp axis.

The pipe saddle part may have a distal end which is at the opposite end thereof to the proximal end, the distal end being connected to the proximal end by an intermediate connecting portion, the pipe saddle part having two longitudinal edges which extend from the proximal end to the distal end and thus form edges of the proximal end, the intermediate connecting portion, and the distal end of the pipe saddle part.

The distal end may be provided with at least one generally semi-circular recess which is adapted, in use, to receive and support an auxiliary pipe which extends generally parallel to and spaced from a riser to which the riser clamp is secured.

One or more of the body portions may be formed as a single part with the slot an integral part thereof.

One or more of the body portions may alternatively comprise two part-circular parts which are spaced to form the slot therebetween.

Each pipe saddle part may be secured to a body portion by one or more fasteners such as bolts.

In an embodiment, the distance between the longitudinal edges at the proximal end of the pipe saddle part can, for example, be greater than the distance between the longitudinal edges at the intermediate portion so a nose is formed at each longitudinal edge of the proximal end of the pipe saddle part.

The riser clamp may further include at least one strap and tensioning arrangement, the tensioning arrangement being operable so that when the body portions are placed in a circular or part circular array around a tubular riser so that the internal surfaces engage with an external surface of the riser, and the strap is positioned circumferentially around the clamp body to engage with the external surfaces of the body portions, the strap is tensioned to clamp the body portions onto the riser.

In an embodiment of the present invention, the riser clamp can, for example, be provided with two strap and tensioning arrangements which are arranged as described above with the pipe saddle part located between the two straps.

The riser clamp may in this case be further provided with two securing bars which, when the riser clamp is mounted on a riser as described above, and the proximal end of the pipe saddle part placed in the slot, are each adapted to be placed between the strap and the clamp body and over one of the noses of the pipe saddle part so as to prevent the proximal end of the pipe saddle part from being removed from the slot.

The securing bars may each have a longitudinal axis, and be, in use, arranged with their longitudinal axis generally parallel to the clamp axis.

The riser clamp may further comprise a support bracket comprising a radially extending portion which is secured to one of the major faces of the pipe saddle part, and a base portion which extends generally perpendicular to the radially extending portion.

These and other characteristics will become clear from the following description of illustrative embodiments, which are provided as non-restrictive examples, with reference to the attached drawings.

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the present invention. The terms are used for the reader's convenience only and shall not be limiting.

Referring now to FIG. 1, there is shown a riser 10 having a longitudinal axis A, an external surface 10a and internal surface 10b, with two auxiliary pipes 12, 14 arranged outside the riser 10 generally parallel to the longitudinal axis A of the riser 10 and spaced from its external surface 10a. In this embodiment, the two auxiliary pipes 12, 14 are arranged diametrically opposite to one another, with the riser 10 lying therebetween. The two auxiliary pipes 12, 14 may, for example, be the choke and kill lines which can be used to shut down the well in an emergency situation, or control the pressure in the well, respectively.

Figure 2:
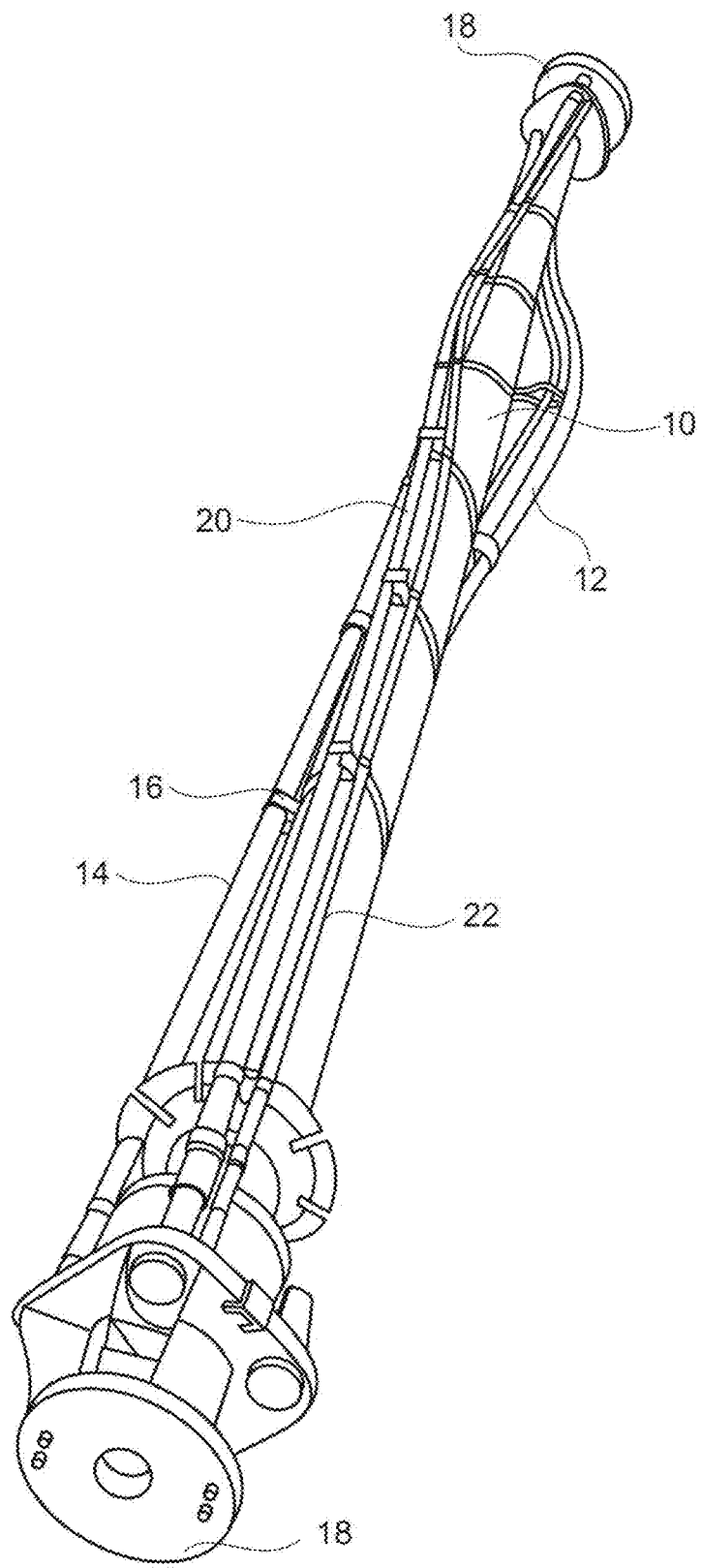
FIG. 2 is a perspective view of a damaged riser section of the type suitable for use with riser clamps according to the present invention.

The riser 10 is made up of a plurality of riser sections, one of which is illustrated in FIG. 2. Each riser section has end fittings 18 at either end which enable it to be secured to the adjacent riser section. FIG. 2 also shows additional auxiliary pipes 20, 22 secured to the riser 10.

The two auxiliary pipes 12, 14 each comprise a plurality of lengths of pipe, one for each riser section, the lowermost end of each length of pipe being supported at its lowermost end by the end fitting 18 of their respective riser section. In some embodiments, both ends of each pipe length are secured to the end fitting at both ends of the riser section. Adjacent pipe lengths are typically connected via a pin and box connection to form a continuous pipeline which extends along the entire length of the riser 10. The auxiliary pipes 12, 14 are also secured to the riser 10 at intervals along their length via a plurality of riser clamps 16 which are spaced along the length each riser section, one of which is illustrated in FIG. 2.

When the auxiliary pipes 12, 14, 20, 22 are pressurized, and the riser clamps 16 are inadequately fixed to the riser 10, the riser clamps 16 may rotate around the riser 10, and allow the auxiliary pipes 12, 14, 20, 22 to twist around the riser 10 and buckle as illustrated in FIG. 2. If the connection between the riser clamps 16 and any of the auxiliary pipes 12, 14, 20, 22 is not adequate, when pressurized, the auxiliary pipes 12, 14, 20, 22 may also buckle radially outwardly relative to the riser 10. Any such twisting or buckling of any of the auxiliary pipes 12, 14, 20, 22 significantly increases the risk of the pipe rupturing and must therefore be avoided.

The riser clamp 16 comprises a plurality of body portions 24 which together can be arranged to form a generally circular or part clamp body 26 which encircles a clamp axis, each body portion 24 having a radially outward facing external surface 24a and a radially inward facing internal surface 24b. In this case, two generally semi-circular body portions 24 are provided, but it will be appreciated that more than two arcuate body portions 24 could be provided, which together encircle the riser 10.

The riser clamp 16 further comprises at least one separate generally planar pipe saddle part 28. In this embodiment, two pipe saddle parts 28 are provided, one secured to each body portion 24. Each pipe saddle parts 28 has a distal end 28a which is at the opposite end thereof to a proximal end 28b, the distal end 28a being connected to the proximal end by an intermediate connecting portion 28c. Each pipe saddle part 28 has two longitudinal edges which extend from the proximal end 28b to the distal end 28a and thus form edges of the proximal end 28b, intermediate connecting portion 28c, and distal end 28a of the pipe saddle part 28.

The distal end 28a is provided with at least one generally semi-circular recess 30 which is adapted, in use, to receive and support an auxiliary pipe 12, 14. In this particular embodiment, two recesses 30 are provided in each pipe saddle part 28, one in each longitudinal edge of the pipe saddle part 28. The size and curvature of each recess 30 is adapted to the diameter of the associated auxiliary pipe 12, 14.

When the riser clamp 16 is mounted around a riser 10, an auxiliary pipe 12, 14 may be placed in each recess 30, and the pipe 12, 14 secured in place via a clamp 32 which is pivotally connected to the pipe saddle part 28 and secured in place via nuts and bolts just as in the prior art arrangement illustrated in WO 2010/10732.

Figure 3:
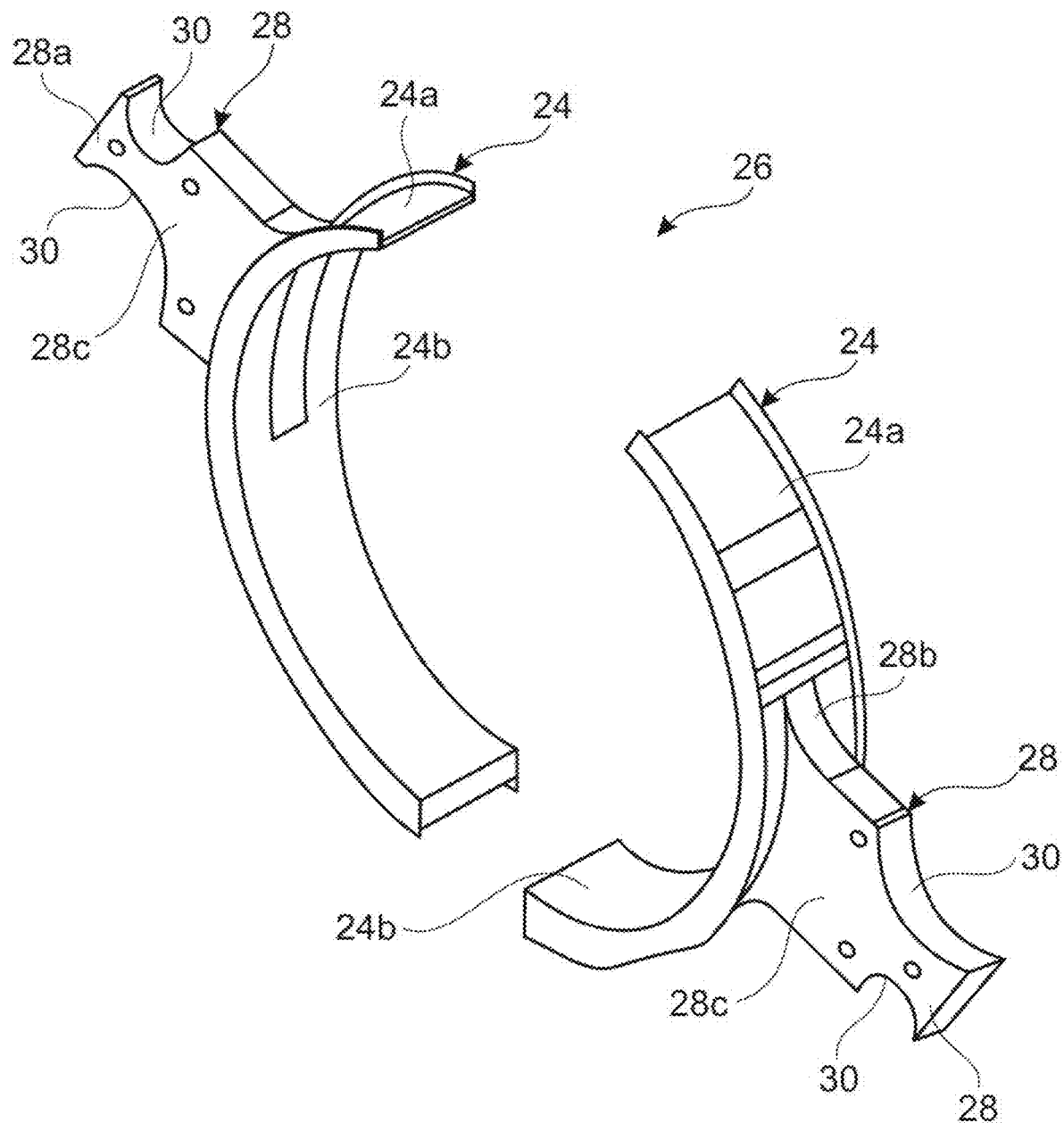
FIG. 3 is a perspective view of the two body portions and associated pipe saddle parts of a riser clamp according to the present invention.

The body portions 24 and pipe saddle parts 28 are illustrated in FIG. 3.

Figure 4:
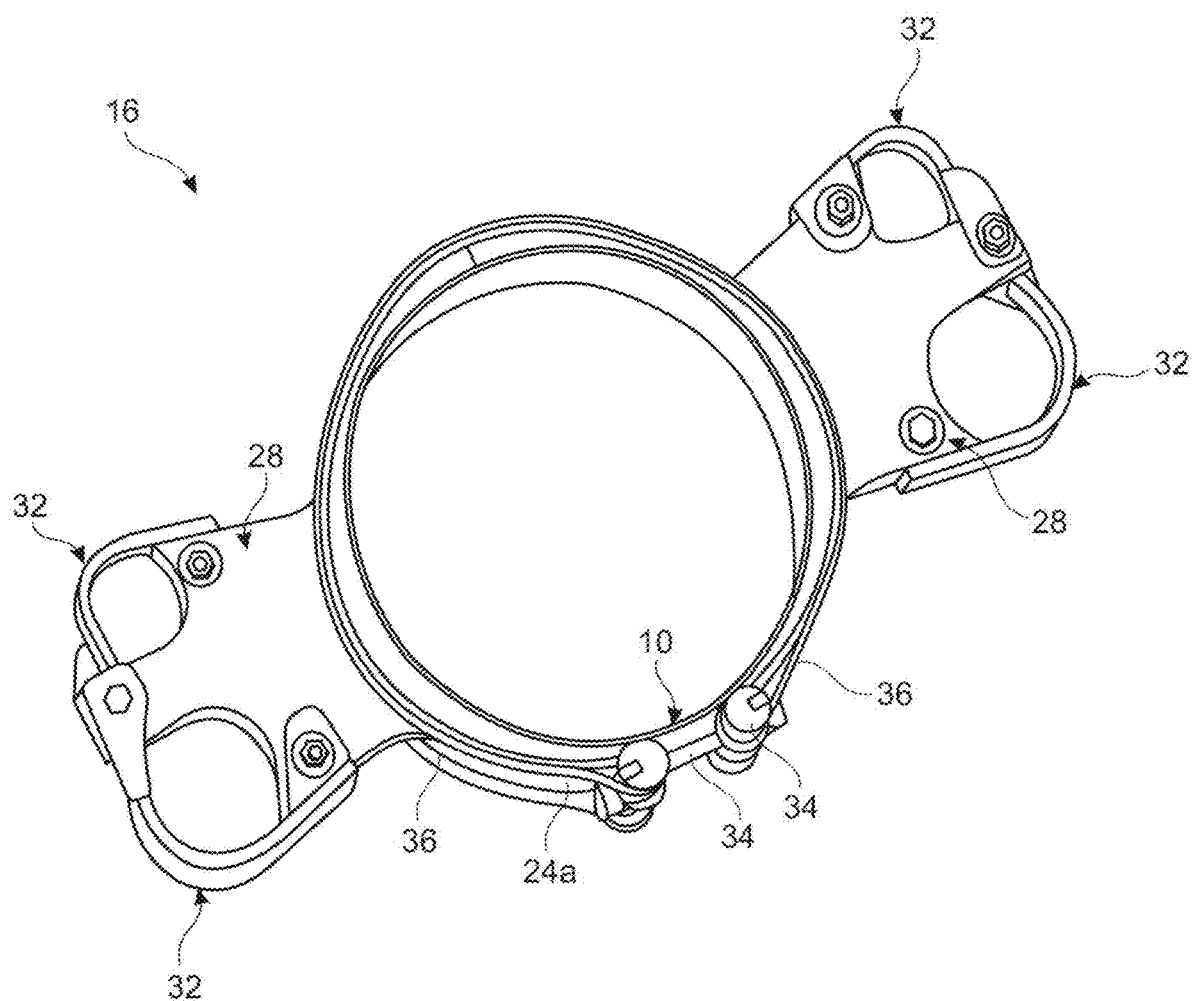
FIG. 4 is a perspective view of an assembled riser clamp according to the present invention.

The riser clamp 16 further includes at least one strap and tensioning arrangement 34, the strap and tensioning arrangement 34 being operable so that when the body portions 24 are placed in a circular or part circular array around the riser 10 so that the internal surfaces 24b engage with the external surface 10a of the riser 10, and the strap 36 is positioned circumferentially around the clamp body 26 to engage with the external surfaces 24a of the body portions 24, the strap 36 is tensioned to clamp the body portions 24 onto the riser 10, as is illustrated in FIG. 4. The strap and tensioning arrangement 34 could include shackles and a tightening screw as described in WO 2010/10732. The straps 36 may be made from Kevlar®.

In this embodiment of the present invention, the riser clamp 16 is provided with two strap and tensioning arrangements 34 which are arranged as described above, with the pipe saddle parts 28 located between the two straps 36 just as described in WO 2010/10732.

In this embodiment, the body portions 24 and pipe saddle parts 28 are each made from a fiber-reinforced composite. The fibers could be carbon, aramide or glass fibers, and could be embedded in a resin matrix made from any suitable polymer such as vinyl ester, polyester or epoxy.

The fiber-reinforced composite can, for example, be constructed by known composite manufacturing techniques, with the fibers in layers. The fibers in each layer and the layers are oriented depending on the main directions of the forces acting on each part. The fiber layers are advantageously arranged circumferentially around the body portions 24, and parallel to the major faces of the pipe saddle parts 28, with two orthogonal sets of fibers being provided in each layer. The body portions 24 may be cut from a length of fiber-reinforced composite pipe.

It will be appreciated that in prior art riser clamps of the type illustrated in WO 2010/10732, the pipe saddles are integral with the body portions, and as the pipe saddles extend generally perpendicular to the longitudinal axis of the riser, laying up the reinforcing fibers in this way so as to provide both the clamp parts and pipe saddles with the required mechanical properties would be relatively complicated and time-consuming. Fabricating the body portions 24 and pipe saddle parts 28 separately as in the present invention may thus significantly simplify the construction of the riser clamp 16.

Making the pipe saddle parts 28 separate to the body portions 24 of course means that a mechanism must be provided for securing each pipe saddle part 28 to a body portion 24. In the embodiments illustrated in FIGS. 3 to 10, this is achieved by providing each body portion 24 with a slot in which the proximal end 28b of one of the pipe saddle parts 28 is placed.

Each slot extends inwardly from the external surface 24 of the body portion so that, when placed in the slot, the pipe saddle part 24 extends radially outwardly from the external surface 24a of the body portion 24. In this embodiment, each slot extends through the entire thickness of the body portion 24 from the external surface 24a to the internal surface 24b.

The slot has a longitudinal axis which extends generally perpendicular to the clamp axis. The sides of the slot are moreover generally perpendicular to the clamp axis. When the pipe saddle part 28 is placed in the slot, the pipe saddle part 28 therefore also lies generally perpendicular to the clamp axis.

Figure 8:
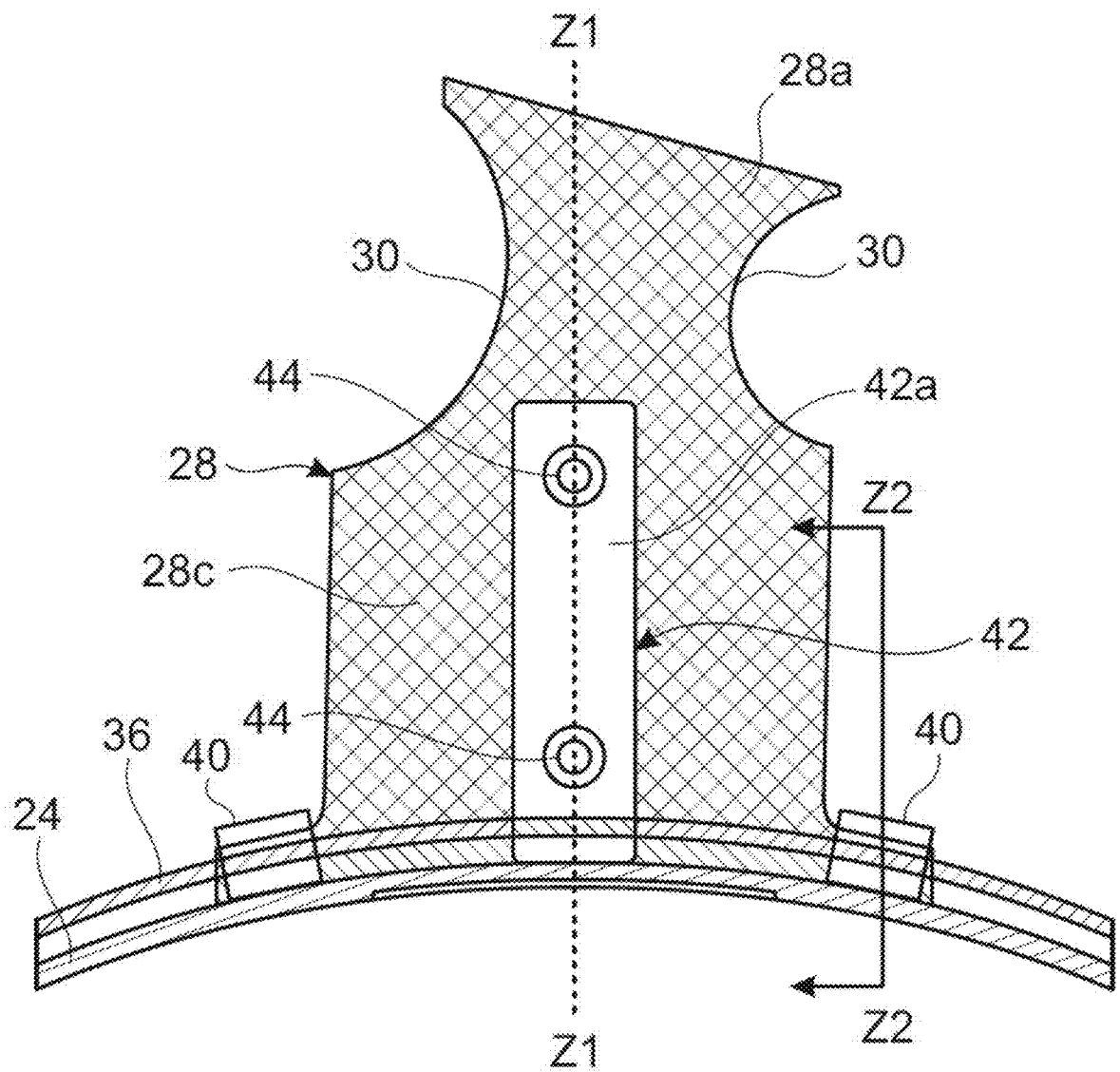
FIG. 8 shows a top view of a portion of an alternative embodiment of riser clamp according to the present invention, showing a portion of one of the clamp body portions and one of the pipe saddle parts.

In order to retain the pipe saddle part 28 in the slot, the distance between the longitudinal edges at the proximal end 28b of the pipe saddle part 28 is greater than the distance between the longitudinal edges at the intermediate connecting portion 28c so a nose 38 is formed at each longitudinal edge of the proximal end 28b of the pipe saddle part 28. This is best seen in FIGS. 5 and 8.

Figure 5:
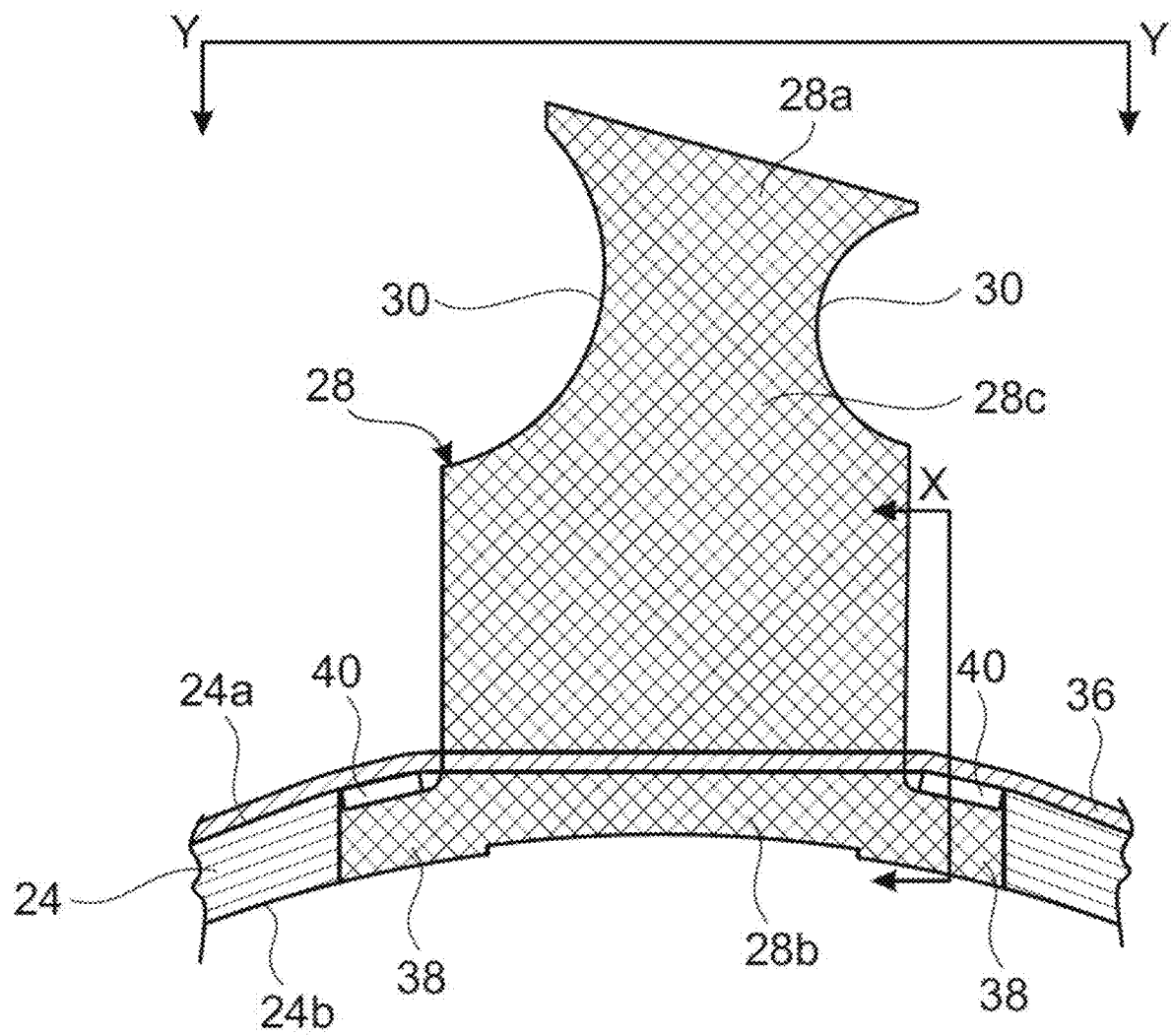
FIG. 5 shows a top view of a portion of the riser clamp illustrated in FIG. 4, showing a portion of one of the clamp body portions, and one of the pipe saddle parts.
Figure 6:
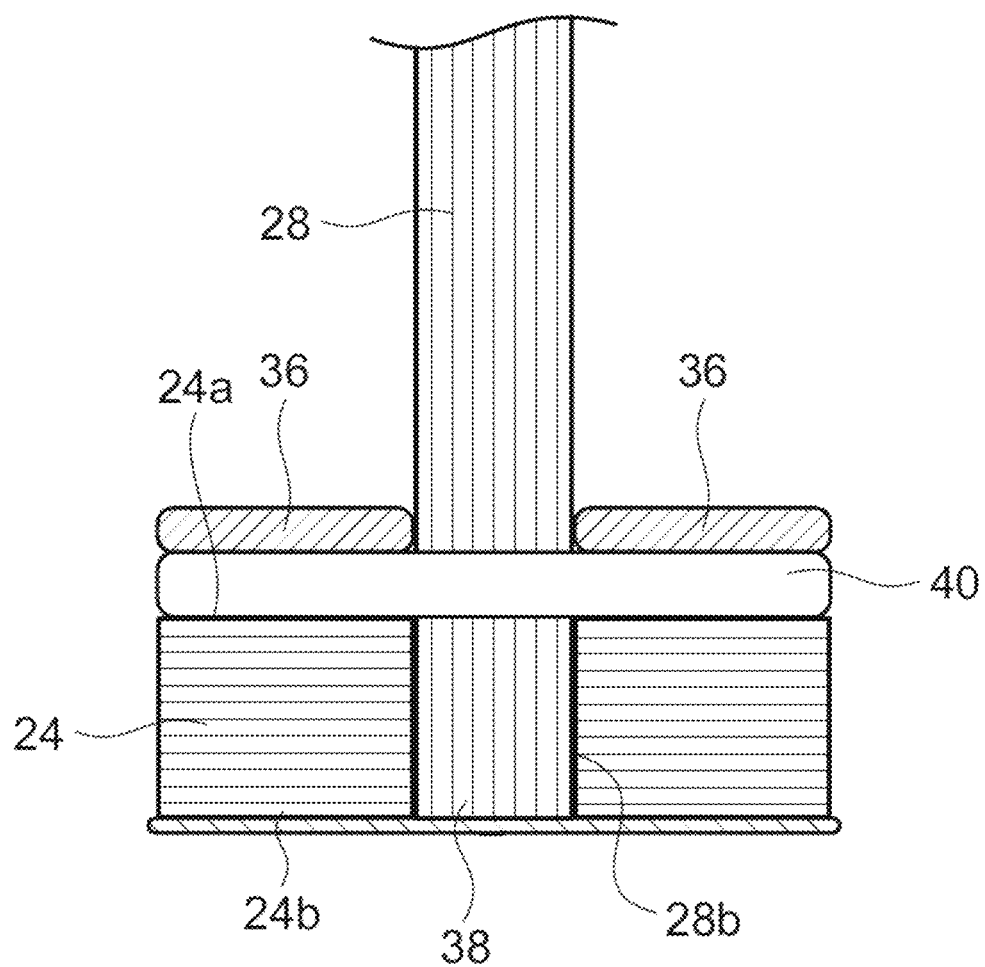
FIG. 6 shows a radial cross-section and side view of a portion of the riser clamp illustrated in FIG. 4 along the line X in FIG. 5.
Figure 7:
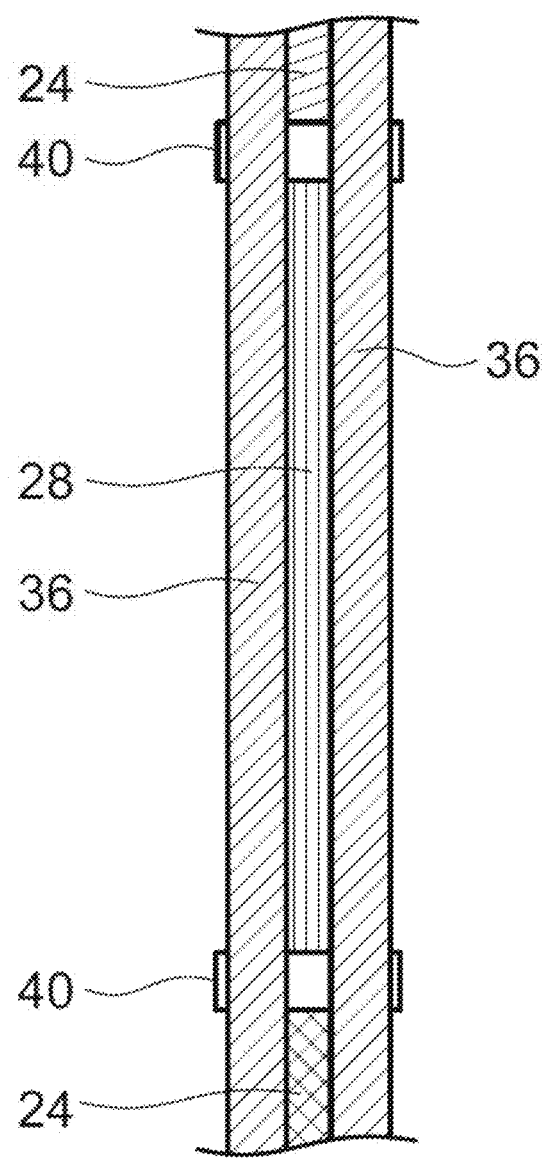
FIG. 7 shows a side view of the portion of the riser clamp illustrated in FIG. 4 along the line Y in FIG. 5.

In the embodiment illustrated in FIGS. 5 to 7, the depth of each nose 38 (i.e., its thickness in the radial direction perpendicular to the clamp axis) is substantially the same as the thickness of the body portion 24 (i.e., the separation between the external surface 24a and the internal surface 24b of the body portion 24). The body portion 24 and nose 38 may, for example, be around 30 mm thick.

It will be appreciated that if the proximal end 28b of the pipe saddle part 28 is sized relative to the slot so as to have a tight interference fit in the slot, in particular with both longitudinal edges of the slot engaging with the two opposite major faces of the pipe saddle part 28, and the thickness of the body portion 24 is sufficiently large, the engagement of the proximal end 28b of the pipe saddle part 28 with the edges of the slot will be sufficient to prevent the pipe saddle part 28 from pivoting to any significant degree when the distal end 28a of the pipe saddle part 28 is acted on by forces directed generally parallel to the clamp axis. If it is not possible to achieve a sufficiently good fit of the slot around the pipe saddle part 28, a filler could be inserted into any gaps between the body portion 24 and the pipe saddle part 28. The frictional forces between the proximal end 28b of the pipe saddle part 28 and the body portion 24/filler may not, however, be sufficient to retain the pipe saddle part 28 in the slot when the pipe saddle part is subjected to radially outward or tangential forces acting perpendicular to the clamp axis.

In this embodiment, the riser clamp 16 is therefore further provided with two securing bars 40 which, when the riser clamp 16 is mounted on a riser 10 as described above, with the proximal end 28b of the pipe saddle part 28 placed in the slot, are each placed over one of the noses 38 of the pipe saddle part 28 so as to prevent the proximal end 28b of the pipe saddle part 28 from being removed from the slot.

The securing bars 40 each have a longitudinal axis and are arranged with their longitudinal axis generally parallel to the clamp axis, with the intermediate connecting portion 28c of the pipe saddle part 28 extending radially outwardly from between the two securing bars 40. The securing bars 40 are longer than the thickness of the pipe saddle part 28 so that the ends of the securing bars 40 engage with the external surface 24a of the body portion 24 on either side of the nose 38. When securing riser clamp 16 to the riser 10, the straps 36 thus extend over the ends of the securing bars 40. The straps 36 therefore clamp the securing bars 24 to the body portion 24, thus providing that the securing bars 40 can act on the associated nose 38 of the pipe saddle part 28 and prevent it from being pulled out of the slot.

It will be appreciated that to achieve this, the securing bars 40 must be relatively rigid, and in one embodiment, the securing bars 40 are made from metal, for example, from stainless steel.

In order to improve the ease of assembly of the riser clamp 16, the securing bars 40 could be fastened to the body portions 24 via one or more fasteners such as screws, after the pipe saddle parts 28 are inserted into the slots, but before the straps 36 are mounted around the clamp body 26. These fasteners would be provided merely to keep the securing bars 40 in place while the straps 36 are placed around the clamp body 26 and tensioned. They would not be intended to keep the securing bars 40 and pipe saddle part 28 in place when radially outwardly forces act on the pipe saddle parts 28 during use of the riser clamp 16, this being the function of the straps 36. These fasteners could therefore be relatively small.

Figure 9:
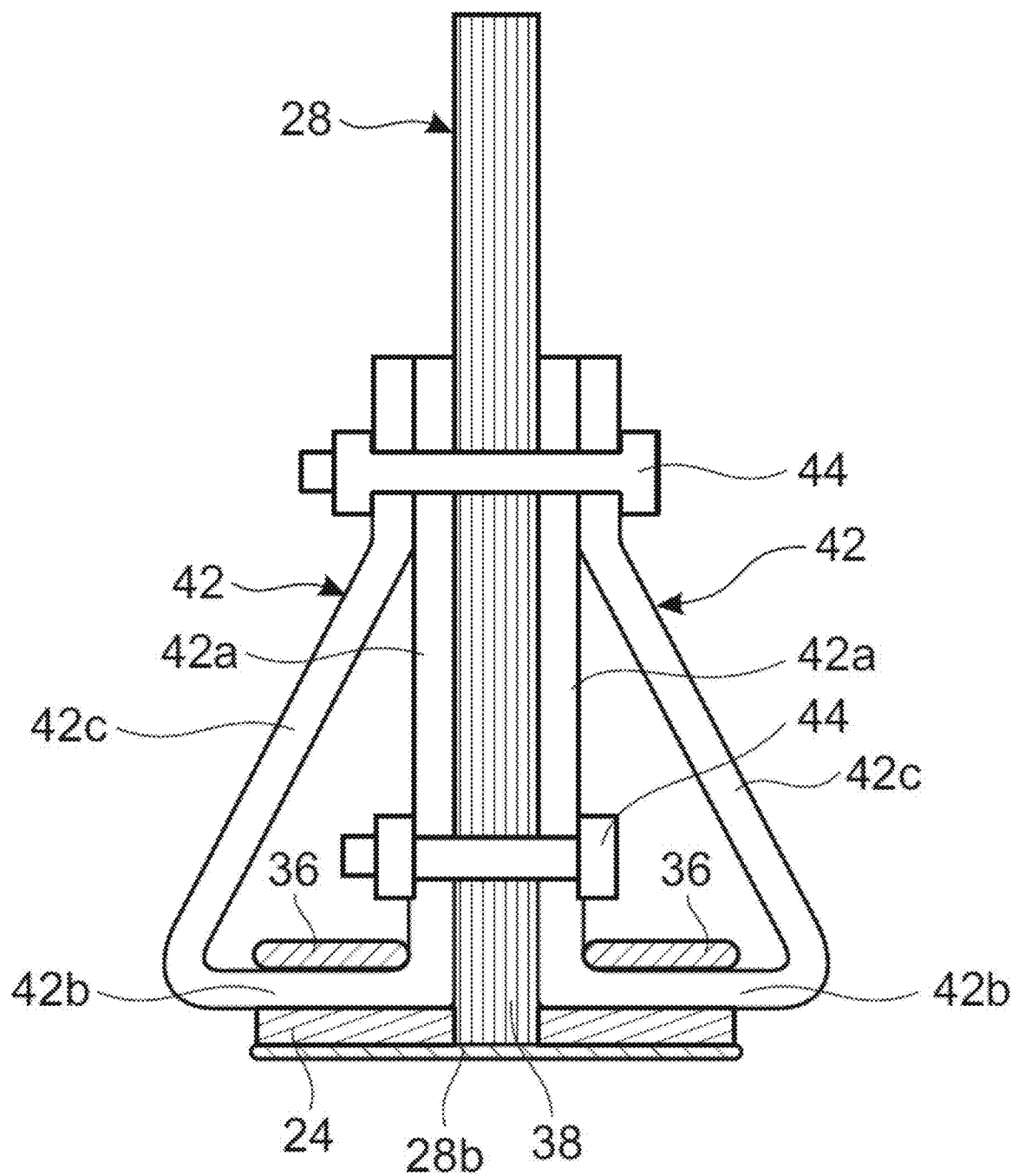
FIG. 9 shows a radial cross-section and side view of a portion of the riser clamp illustrated in FIG. 8 along the line Z1.
Figure 10:
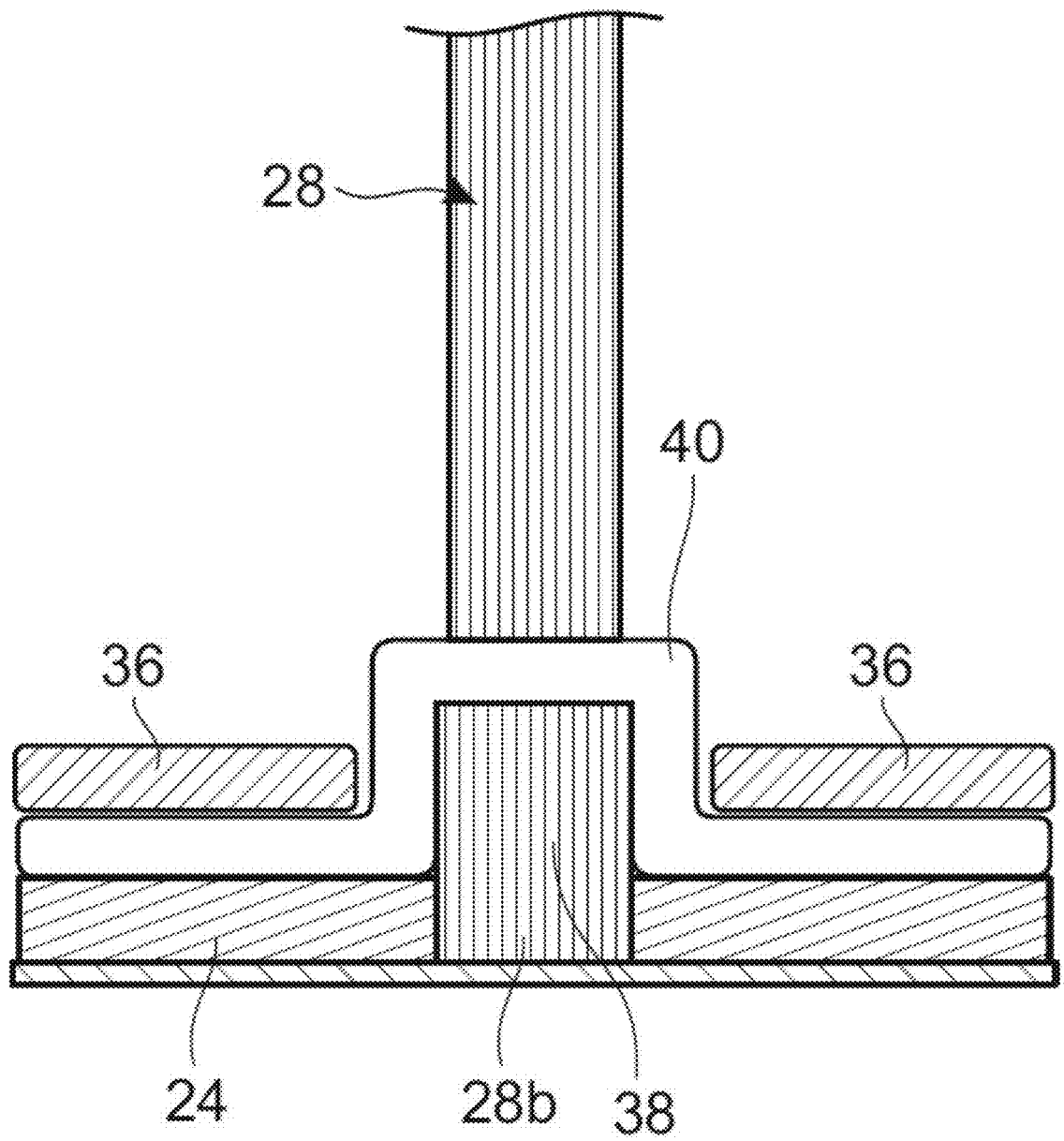
FIG. 10 shows a radial cross-section and side view of the portion of the riser clamp illustrated in FIG. 8 along the line Z2.

If the body portion 24 is not thick enough to prevent the pipe saddle part 28 from pivoting to any significant degree when the pipe saddle part 28 is acted on by forces directed generally parallel to the clamp axis, it may be necessary to provide a separate support bracket 42 to prevent or minimize such movement, as illustrated in FIGS. 8 to 10.

The support bracket 42 includes a radially extending portion 42a which is secured in this example via a fastener, such as a bolt 44, to one of the major faces of the pipe saddle part 28, and a base portion 42b, which extends generally perpendicular to the radially extending portion 42a. In use, the straps 36 are placed over the base portion 42b so that the base portion 42b is clamped between the straps 36 and the body portion 24 of the riser clamp 16, as illustrated in FIGS. 8 and 9. The support bracket 42, and hence the pipe saddle part 28, is thus clamped to the body portion 24 of the riser clamp 16.

While one such support bracket 42 might be sufficient to restrain movement of the pipe saddle part 28 relative to the riser 10, in this embodiment, two such support brackets 42 are provided for each pipe saddle part 28, the two support brackets 42 being secured to opposite faces of the pipe saddle part 28.

While the support bracket 42 could be L-shaped and comprise only the radially extending portion 42a and the base portion 42b, in this embodiment, each support bracket 42 is further provided with a support strut 42c which extends from an outer end of the base portion 42b to a top end of the radially extending portion 42a so that the radially extending portion 42a, base portion 42b, and support strut 42c, form three sides of a triangle, as illustrated in FIG. 9.

The radially extending portion 42a, base portion 42b, and support strut 42c may be integral so that the support bracket 42 is made from a single piece. In the example illustrated in FIGS. 8 to 10, the support bracket 42 is made from a single piece of metal which is bent to form the radially extending portion 42a, base portion 42b, and support strut 42c. In this example, the portion of metal which forms the base portion 42 lies between the portions which form the radially extending portion 42a and the support strut 42c, and the support strut 42c is secured to the radially extending portion 42a using one of the fasteners 44 used to secure the radially extending portion 42a to the pipe saddle part 28.

It will be appreciated that, while in the embodiment illustrated in FIGS. 8 to 10, the support brackets 42 are used in addition to securing bars 40, they could be used instead of the securing bars 40. It would in this case not be necessary to provide the pipe saddle support parts 28 with the noses 38 described above.

In the embodiment of the present invention illustrated in FIGS. 8 to 10, the body portion 24 is thinner than the depth of each nose 38 so that the radially outwardly facing edge of each nose 38 extends out of the slot at the external surface 24a of the body portion 24. The securing bars 40 in this embodiment are not flat as they are in the embodiment illustrated in FIGS. 5 to 7. The securing bars 40 in this embodiment have a stepped central section 40a which is shaped to allow the securing bar 40 to engage with both the nose 38 and the body portion 24 on either side of the nose 38, as illustrated in FIG. 10.

It should be appreciated that the support brackets 42 illustrated in FIGS. 8 to 10 could equally be used where the thickness of the body portion 24 is the same as the depth of the nose 38 as illustrated in FIGS. 5 to 7.

It should also be appreciated that while the embodiment of the present invention described herein includes two pipe saddle parts 28, one mounted on each body portion 24, it would be possible to provide fewer or more pipe saddle parts 28. An additional pipe saddle part could, for example, be mounted on one of the body portions 24 for supporting a booster line.

It will be appreciated that in the embodiment described above, each body portion 24 is formed as a single part with the slot being integral with the body portion 24. In an alternative embodiment of the present invention, each body portion 24 may comprise two separate part-circular parts which are spaced from one another to form the slot therebetween.

Figure 11:
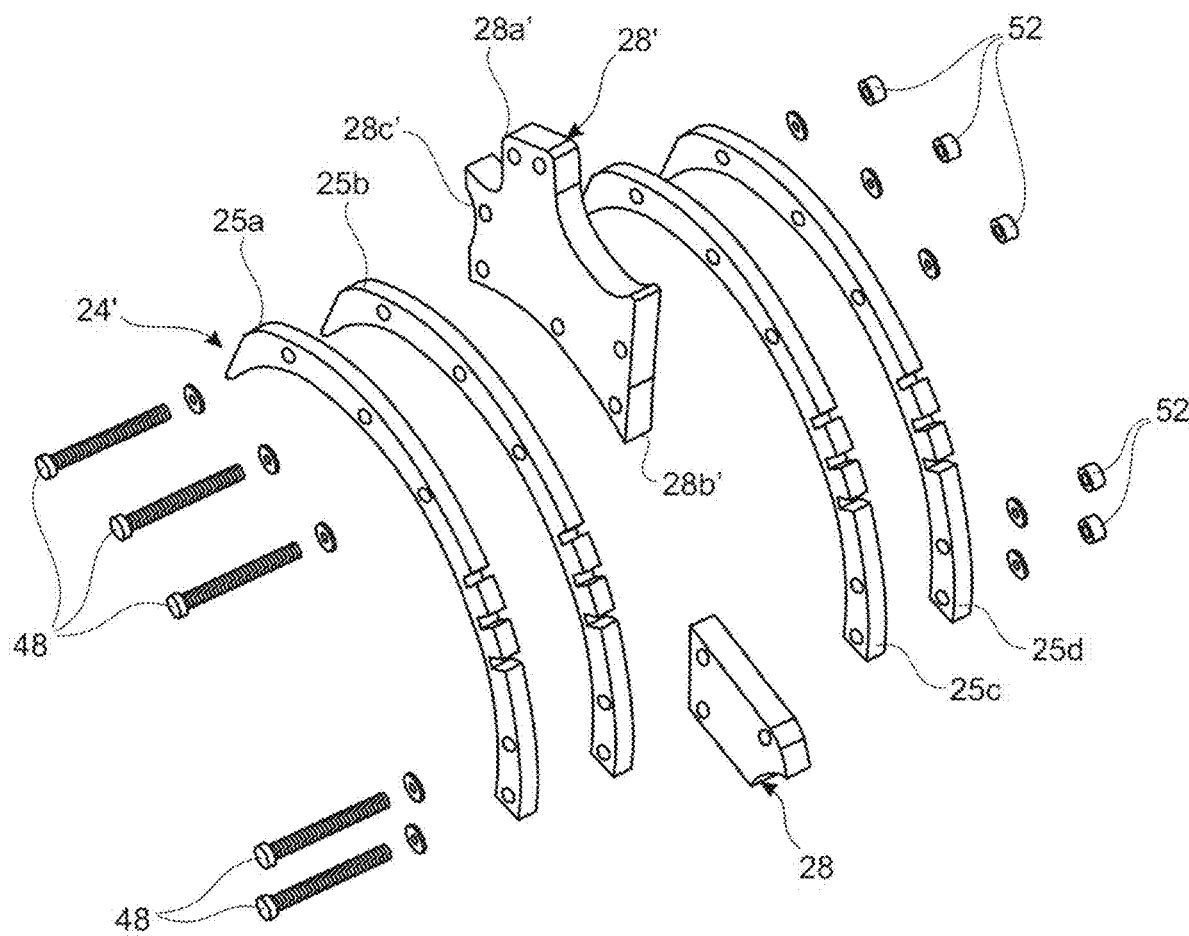
FIG. 11 shows an exploded view of one body portion and pipe saddle part of an alternative embodiment of riser clamp.
Figure 12:
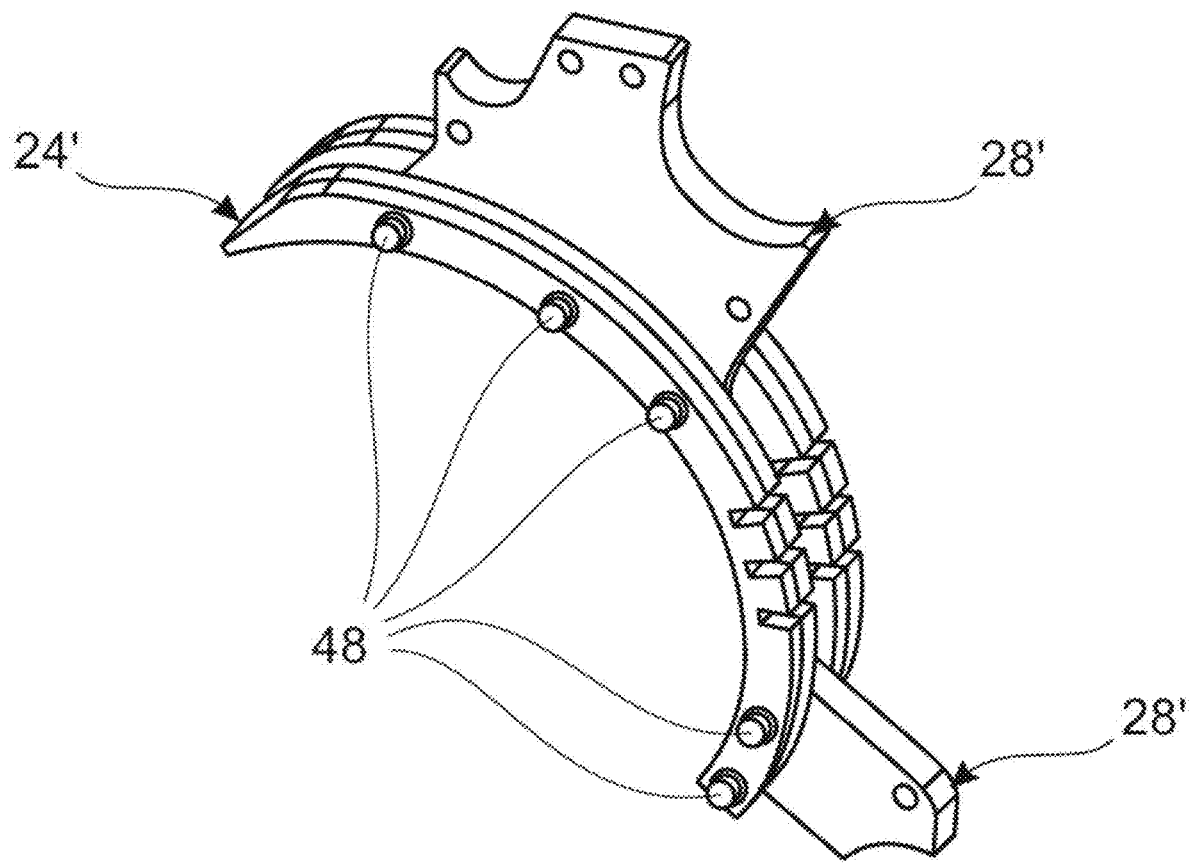
FIG. 12 shows the body portion and pipe saddle part illustrated in FIG. 11 in its assembled state.
Figure 13:
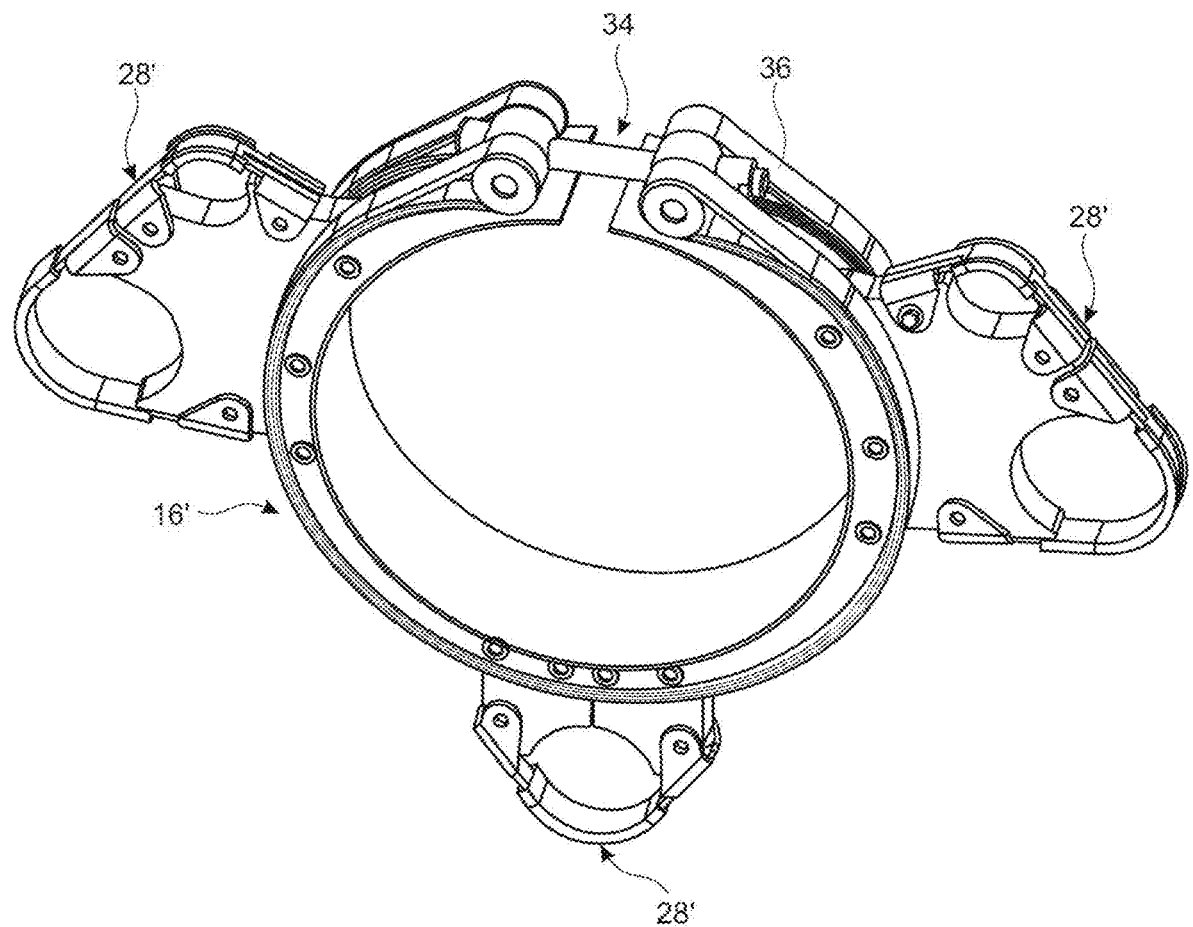
FIG. 13 shows an alternative embodiment of riser clamp including the body portion and pipe saddle parts illustrated in FIGS. 11 and 12.

In the embodiment illustrated in FIGS. 11 to 13, each body portion 24' comprises four separate substantially identical part-circular parts 25a, 25b, 25c, 25d, each of which has two opposite substantially flat faces, and two opposite curved edges, and two end faces. These are best seen in FIG. 11.

The part-circular parts 25a, 25b, 25c, 25d are also made from a fiber-reinforced composite as described above, but in this case each part-circular part 25a, 25b, 25c, 25d can be cut from a plate of the fiber-reinforced composite material.

The riser clamp 16' is assembled by arranging the part-circular parts 25a, 25b, 25c, 25d in pairs with the adjacent flat faces of the parts in a pair in contact, and the proximal end 28b of one of the pipe saddle parts 28 sandwiched between the flat face of one of the part-circular parts 25a, 25b, 25c, 25d of each pair. The part-circular parts 25a, 25b, 25c, 25d are then fastened together, with the proximal end 28b of the pipe saddle part 28 clamped between the two pairs of part-circular parts 25a, 25b, 25c, 25d, as illustrated in FIG. 12.

In this embodiment, the part-circular part 25a, 25b, 25c, 25d is provided with a plurality of holes each of which extends through the part from one of the flat faces to the other, and is aligned with one of the holes in the adjacent part-circular parts 25a, 25b, 25c, 25d. The part-circular parts 25a, 25b, 25c, 25d can then be fastened together by passing a fastener through each of the sets of aligned holes. The fastener may, for example, comprise a bolt 48, the threaded shank of the bolt 48 passing through the holes so that the head engages with the flat face of an outer one of the part-circular parts 25a, 25b, 25c, 25d, and a nut 52 being screwed onto the free end of the threaded shank until the nut 52 engages with the flat face of the opposite outer one of the part-circular parts 25a, 25b, 25c, 25d, as illustrated in FIG. 12.

While the pipe saddle part 28' may simply be clamped between the two pairs of part-circular parts 25a, 25b, 25c, 25d, in this embodiment, the pipe saddle part 28' is fastened to the part-circular parts 25a, 25b, 25c, 25d. The proximal end 28b' of each pipe saddle support part 28' is provided with at least one hole which is aligned with one of the sets of holes through the part-circular parts 25a, 25b, 25c, 25d so that the shank of at least one of the bolts 48 also passes through the hole in the pipe saddle part 28', thus providing that the pipe saddle part 28' cannot be pulled out from in between the pairs of part-circular parts 25a, 25b, 25c, 25d. The pipe saddle part 28' in this embodiment is provided with holes to receive three bolts 48.

This embodiment of riser clamp 16' also uses a strap and tensioning arrangement 34 as described above to secure the body portions 24' in a circular or part-circular array, as illustrated in FIG. 13, around a riser.

In this embodiment, the riser clamp 16' comprises two body portions 24' and is provided with three pipe saddle parts 28'. One of the pipe saddle parts 28' is split in half, one half being secured to an end portion of one of the body portions 24', and the other half being secured to an end portion of the other of the body portions 24', so that when the body portions 24' are clamped around a riser, the two halves come together to act as a single pipe saddle part 28'.

It will be appreciated that it is not necessary for each body portion 24' to comprise exactly four separate part-circular parts 25a, 25b, 25c, 25d. More than four could be provided, in which case more than two part-circular parts would be arranged on one or both sides of the proximal end 28b of the pipe saddle part 28. Only two may alternatively be provided, with one part being arranged on either side of the proximal end 28b of the pipe saddle part 28. In a further alternative, each body portion could comprise only one part, in which case, as the pipe saddle part 28 cannot be clamped between two separate parts, it would be necessary to fasten the pipe saddle part 28 to the body portion 24', for example, using bolts as described above. It should also be appreciated that, while in the embodiment illustrated in FIGS. 11 to 13, the pipe saddle part 28' is secured to the body portion 24' using bolts 48 as described above, and does not include nose 38, this need not be the case. This embodiment of body portion 24' could also be used in conjunction with a pipe saddle part 28 with noses 38 as shown in FIGS. 5 to 10, and the pipe saddle part 28 secured to the body portion 24' using securing bars 40 as described above in relation to the embodiment illustrated in FIGS. 5 to 10, in addition, or in the alternative to, using bolts 48.

It should also be appreciated that while the embodiment of the present invention described herein includes three pipe saddle parts 28', it would be possible to provide only two, one mounted on each body portion 24', as in the embodiment illustrated in FIGS. 3 and 4.

For both embodiments described above, it would also be possible to provide four more pipe saddle parts 28, 28' than shown in the attached drawings. One or more additional pipe saddle parts 28, 28' could be mounted on one or both of the body portions 24, 24'.

It should also be appreciated that it would be possible to provide the riser clamp 16, 16' with only one pipe saddle portion 28. In this case, one of the body portions 24' could be without a pipe saddle part 28, or the riser clamp 16, 16' could include only one body portion 24, 24'. In the latter case, as the body portion 24, 24' would only encircle a portion (half for a semi-circular body portion 24, 24') of the riser 10, that a portion of the straps 36 would engage with the riser 10 as well as the body portion 24, 24'.

It will also be appreciated that while in the embodiments described above, each riser clamp 16, 16' is provided with two body portions 24, 24', each of which is substantially semi-circular, the riser clamp 16, 16' could equally comprise three or more body portions 24, 24'.

It should be appreciated, however, that the body portions 24, 24' and pipe saddle parts 28, 28' need not be made from a fiber reinforced composite. They could simply be made from a polymer without any reinforcement, or they could be metallic.

The present invention is not limited by the embodiments described above; reference should be had to the appended claims.

LIST OF REFERENCE NUMERALS

10 Riser
10a External surface (of riser)
10b Internal surface (of riser)
12 Auxiliary pipe
14 Auxiliary pipe
16 Riser clamp
16' Riser clamp
18 End fitting
20 Auxiliary pipes
22 Auxiliary pipes
24 Body portion
24' Body portion
24a External surface (of body portion)
24b Internal surface (of body portion)
25a Part-circular part
25bb Part-circular part
25c Part-circular part
25d Part-circular part
26 Clamp body
28 Pipe saddle part
28' Pipe saddle part
28a Distal end (of pipe saddle part)
28a' Distal end (of pipe saddle part)
28b Proximal end (of pipe saddle part)
28b' Proximal end (of pipe saddle part)
28c Intermediate connecting portion (of pipe saddle part)
28c' Intermediate connecting portion (of pipe saddle part)
30 Recess
32 Clamp
34 Strap and tensioning arrangement
36 Strap
38 Nose
40 Securing bar
42 Support bracket
42a Radially extending portion
42b Base portion
42c Support strut
44 Fastener/Bolt
48 Bolt
52 Nut
A Longitudinal axis of the riser

What is claimed is:

1. A riser clamp for supporting fluid pipes in parallel with and spaced from an external surface of a tubular riser, the riser clamp comprising:

at least one body portion which is arrangeable to form a clamp body which is substantially circular or partially circular, the clamp body being configured to encircle a clamp axis, the at least one body portion comprising an external surface which faces radially outwards and an internal surface which faces radially inwards; and a pipe saddle part which is provided to be separate and substantially planar, the pipe saddle part being arranged to extend radially outwardly from the clamp body, wherein, the at least one body portion further comprises a slot in which, to assemble the riser clamp, a proximal end of the pipe saddle part is placed.

2. The riser clamp as recited in claim 1, further comprising:
   at least one fastener which is configured to secure the pipe saddle part to the at least one body portion.

3. The riser clamp as recited in claim 1, further comprising:
   a support bracket which comprises a radially extending portion,
   wherein,
   the pipe saddle part further comprises at least one major face and a base portion,
   the radially extending portion of the support bracket is secured to one of the at least one major face of the pipe saddle part, and
   the base portion is arranged to extend substantially perpendicular to the radially extending portion.

4. The riser clamp as recited in claim 1, wherein the pipe saddle part is further arranged to extend generally perpendicular to the clamp axis.

5. The riser clamp as recited in claim 1, wherein the at least one body portion is formed as a single part with the slot being an integral part thereof.

6. The riser clamp as recited in claim 1, wherein the at least one body portion comprises two partially circular parts which are spaced to form the slot therebetween.

7. The riser clamp as recited in claim 1, wherein,
   the slot is arranged to extend inwardly from the external surface of the at least one body portion so that, when placed in the slot, the pipe saddle part extends radially outwardly from the external surface of the at least one body portion.

8. The riser clamp as recited in claim 7, wherein,
   the slot is further arranged to extend through an entire thickness of the at least one of the at least one body portion from the external surface to the internal surface.

9. The riser clamp as recited in claim 1, wherein the slot comprises a longitudinal axis which extends generally perpendicular to the clamp axis.

10. The riser clamp as recited in claim 1, wherein the pipe saddle part comprises,
    a distal end,
    a proximal end which is opposite to the distal end,
    an intermediate connecting portion which connects the distal end to the proximal end, and
    two longitudinal edges which extend from the proximal end to the distal end so as to form edges of the proximal end, the intermediate connecting portion, and the distal end.

11. The riser clamp as recited in claim 10, wherein the distal end comprises at least one recess which is substantially semi-circular or partially-circular, the at least one recess being configured so that, in use, the at least one recess receives and supports an auxiliary pipe which extends generally parallel to and spaced from the tubular riser to which the riser clamp is secured.

12. The riser clamp as recited in claim 10 wherein, a distance between the two longitudinal edges at the proximal end of the pipe saddle part is greater than a distance between the two longitudinal edges at the intermediate connecting portion so that a nose is formed at each of the two longitudinal edges of the proximal end of the pipe saddle part.

13. The riser clamp as recited in claim 1, wherein,
    the at least one body portion is provided as a plurality of body portions,
    the plurality of body portions are arrangeable to together form the clamp body which encircles the clamp axis, and
    the riser clamp further comprises:
    at least one strap and tensioning arrangement which is configured so that, when the plurality of body portions are arranged in a circular array or in a partially circular array around the tubular riser so that the internal surface of the plurality of body portions, respectively, engage with an external surface of the tubular riser, and the at least one strap and tensioning arrangement is positioned circumferentially around the clamp body to engage with the external surface of the plurality of body portions, respectively, the at least one strap and tensioning arrangement is tensioned so as to clamp the plurality of body portions onto the tubular riser.

14. The riser clamp as recited in claim 13, wherein,
    the at least one strap and tensioning arrangement is provided as two strap and tensioning arrangements, and
    the plurality of body portions are configured so that the two strap and tensioning arrangements are positionable circumferentially around the clamp body so as to engage with the external surface of the plurality of body portions, respectively, with the pipe saddle part which is arranged between the two strap and tensioning arrangements.

15. The riser clamp as recited in claim 14, further comprising:
    two securing bars,
    wherein,
    each respective one of the two securing bars, when the proximal end of the pipe saddle part is placed in the slot, are configured to be placed between one of the two strap and tensioning arrangements and the clamp body and over one of the noses of the pipe saddle part so as to prevent the proximal end of the pipe saddle part from being removed from the slot.

16. The riser clamp as recited in claim 15 wherein,
    the two securing bars each comprise a longitudinal axis, and
    the two securing bars, when arranged in use, have their respective longitudinal axis substantially parallel to the clamp axis.

* * * * *